United States Patent
Sampath et al.

(10) Patent No.: US 9,495,258 B2
(45) Date of Patent: Nov. 15, 2016

(54) DYNAMIC GENERATION OF DISASTER RECOVERY PLAN WHICH REACT TO CHANGES TO AN UNDERLYING TOPOLOGY

(71) Applicant: Oracle International Corporation, Redwood Shores, CA (US)

(72) Inventors: Praveen Sampath, Pleasanton, CA (US); Rama Vijjapurapu, Pleasanton, CA (US); Mahesh Desai, Sunnyvale, CA (US); Shekhar Borde, Fremont, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 14/265,572

(22) Filed: Apr. 30, 2014

(65) Prior Publication Data

US 2015/0317220 A1 Nov. 5, 2015

(51) Int. Cl.
G06F 11/00 (2006.01)
G06F 11/20 (2006.01)
H04L 12/24 (2006.01)

(52) U.S. Cl.
CPC .......... G06F 11/2023 (2013.01); H04L 41/12 (2013.01)

(58) Field of Classification Search
USPC ........................................................ 714/6.3
See application file for complete search history.

(56) References Cited

U.S. PATENT DOCUMENTS

| | | | |
|---|---|---|---|
| 7,770,057 B1 | 8/2010 | Graham | |
| 2006/0171302 A1* | 8/2006 | Tallet | H04L 12/4625 370/225 |
| 2007/0124347 A1 | 5/2007 | Vivian | |
| 2007/0124348 A1 | 5/2007 | Claborn | |
| 2007/0168704 A1 | 7/2007 | Connolly | |
| 2007/0198700 A1 | 8/2007 | Vivian | |
| 2008/0126845 A1 | 5/2008 | Luo | |
| 2008/0126846 A1 | 5/2008 | Vivian | |
| 2009/0037762 A1 | 2/2009 | Gozzo | |
| 2009/0113233 A1 | 4/2009 | Phan | |
| 2009/0222498 A1 | 9/2009 | Lu | |
| 2010/0077257 A1 | 3/2010 | Burchfield | |
| 2010/0268991 A1 | 10/2010 | Birch | |
| 2012/0284559 A1* | 11/2012 | Akirav | G06F 11/1456 714/6.2 |
| 2013/0326260 A1 | 12/2013 | Wei | |
| 2013/0326265 A1* | 12/2013 | Garai | G06F 11/2038 714/6.3 |
| 2014/0279897 A1 | 9/2014 | Bourbonnais | |
| 2015/0317194 A1 | 11/2015 | Sampath et al. | |
| 2015/0317221 A1 | 11/2015 | Sampath et al. | |

* cited by examiner

*Primary Examiner* — Sarai Butler
(74) *Attorney, Agent, or Firm* — Hickman Palermo Becker Bingham LLP; Marcel K. Bingham

(57) ABSTRACT

Techniques are described for dynamically generating a disaster recovery plan. In an embodiment, a set of topology metadata is determined for a first site on which a multi-tier application is deployed and a second site where the multi-tier application will be activated in the event of switchover/failover. The topology metadata may include metadata that identifies a set of targets associated with a plurality of tiers on the first site on which the multi-tier application is deployed and also on the second site where the multi-tier application would be activated in the event of disaster recovery operation like switchover or failover. Based, at least in part, on the topology metadata for the first site and second site, a disaster recovery plan is generated. The disaster recovery plan includes an ordered set of instructions for deactivating the multi-tier application at the first site and activating the multi-tier application at a second site.

20 Claims, 10 Drawing Sheets

DYNAMIC GENERATION OF DISASTER RECOVERY PLAN WHICH REACT TO CHANGES TO AN UNDERLYING TOPOLOGY

CROSS-REFERENCE TO RELATED APPLICATIONS

This application is related to application Ser. No. 14/265,607, filed Apr. 30, 2014, entitled "Comprehensive Error Management Capabilities For Disaster Recovery Operations", and application Ser. No. 14/265,616 filed Apr. 30, 2014, entitled "Periodic Validation of Health Reports of Disaster Recovery Plan", the entire contents of which is hereby incorporated by reference as if fully set forth herein.

FIELD OF THE DISCLOSURE

The present disclosure relates, generally, to failover systems and, more specifically, to techniques for generating disaster recovery plans based on an underlying topology.

BACKGROUND

Enterprise deployments of large-scale systems may involve frequent changes to the underlying components within the system. For example, software and/or hardware components may be scaled up, scaled down, or scaled out. The state of the enterprise deployment may also change based on the availability of components or the underlying infrastructure. Certain components may become unavailable due to scheduled maintenance, unforeseen device malfunctions, or some other source of failure.

One approach for guarding against unforeseen failures or natural disasters involves data replication. According to this approach, data that is stored at a primary site is copied to a standby site at a geographically different location. If data at the primary site becomes fully or partially unavailable for any reason, then it may be recovered from the standby site. This approach protects data from data loss or corruption stemming from failures, disasters, and/or human error. However, recovery is limited to the storage tier, which may not allow for a full-scale recovery in multi-tier systems. For example a system stack may include, without limitation, applications, middleware, administration servers, web servers, database storage etc. Restoring each layer of the stack after a disaster may be a tedious process involving complex execution and coordination between application, replication, and/or infrastructure experts.

Another approach for disaster recovery is to have a system administrator define custom scripts to perform disaster recovery operations. According to this approach, the administrator may create scripts for different tiers within a multi-tiered system. However, in large-scale systems, it may become extremely difficult and error prone to maintain and update the custom scripts to accommodate frequent changes to the underlying system components. Furthermore, home-grown scripts do not provide a standard, comprehensive set of error management capabilities in the event that a problem is encountered during disaster recovery.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Various embodiments are illustrated by way of example, and not by way of limitation, in the figures of the accompanying drawings and in which like reference numerals refer to similar elements and in which.

DETAILED DESCRIPTION

Figure 1:
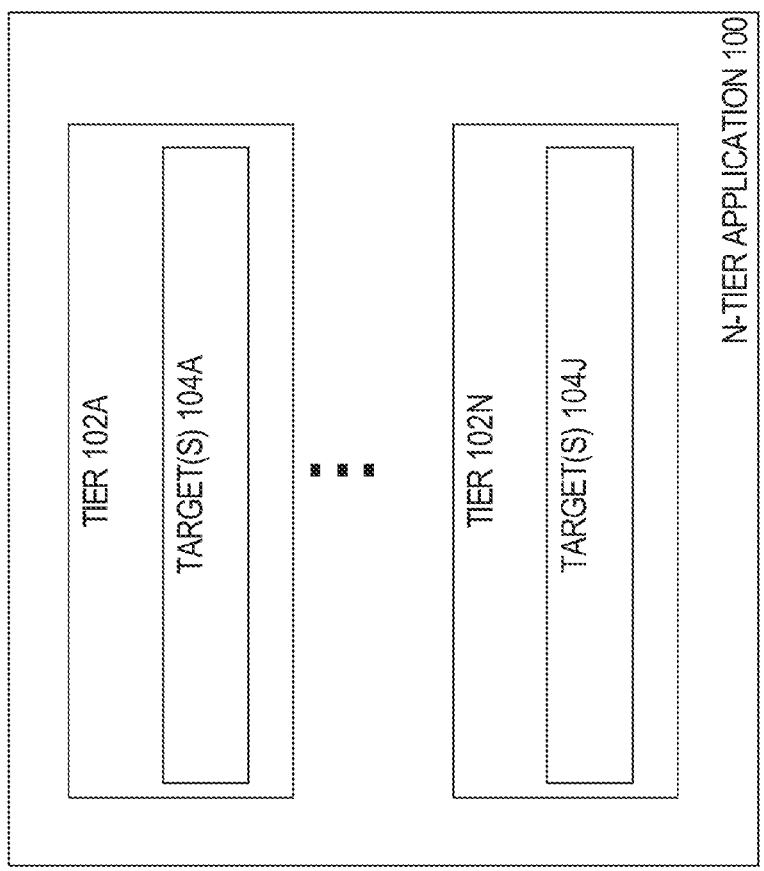
FIG. 1 is a block diagram depicting an example N-tier architecture, according to an embodiment.

In the following description, for the purposes of explanation, numerous specific details are set forth in order to provide a thorough understanding of the disclosure. It will be apparent, however, that the present invention may be practiced without these specific details. In other instances, structures and devices are shown in block diagram form in order to avoid unnecessarily obscuring the present invention.

General Overview

Techniques are described for dynamically generating a disaster recovery plan. The disaster recovery plan may be generated such that it takes into account the current state of deployment of a primary site, reacting to any changes that may have occurred. In an embodiment, a disaster recovery system maintains a set of topology metadata for a primary site and one or more standby sites. The topology metadata may be used to identify a set of targets from a plurality of tiers on the primary site and the one or more standby sites. Based, at least in part, on the topology metadata, the disaster recovery system may generate a disaster recovery plan that includes an ordered set of instructions for relocating a multi-tier application that is deployed on the primary site to a standby site. If the primary site becomes unavailable due to a planned or an unplanned outage, the steps of the disaster recovery plan may be processed by the disaster recovery system to perform a site switchover or failover operation.

Techniques are further described for providing comprehensive error management capabilities with respect to disaster recovery operations. The error management capabilities allow a user to define or otherwise control how a disaster recovery system handle errors encountered while executing a disaster recovery plan. In an embodiment, the user may specify error modes for individual steps in a disaster recovery plan. If an error is encountered while processing a particular step, the disaster recovery system may determine the error mode associated with the step. The disaster recovery system may then implement error handling logic in accordance with the error mode.

Techniques are further described for performing health and validation checks on a disaster recovery plan. Validating the disaster recovery plan may help confirm that the steps of the disaster recovery plan are correct and relevant. For example, validation may prevent problems that may arise if the disaster recovery operation plan is out of sync with the actual topology of a primary site or standby site at the time of a disaster recovery event. If a problem is encountered, then it may be reported to an administrator, allowing the administrator to take corrective action appropriately.

Multi-Tier System Overview

Techniques described herein may be implemented using a multi-tier application architecture. A multi-tier application architecture allocates different responsibilities of an application or group of related applications (herein referred to as a "multi-tier application") across different tiers of an application stack.

Each "tier" or "layer" of a multi-tier architecture represents a distinct logical and/or physical element that is responsible for a different set of responsibilities within the multi-tier system. The number and configuration of tiers within a multi-tier architecture may vary, depending on the particular implementation. For example, a three-tier system may comprise a presentation tier for displaying and/or receiving information for the multi-tier application, an application tier comprising application logic for processing data, and a data tier comprising database servers for storing and retrieving data. In other embodiments, the multi-tier architecture may include, in addition or alternatively to the tiers previously listed, a web tier comprising servers such as Hypertext Transfer Protocol (HTTP) servers for processing web requests and/or a middleware tier for transforming data received from one tier before sending the transformed data to another tier.

A tier may be upgraded or otherwise changed independently of other tiers within the multi-tier system. For example, components within the data tier may be upgraded, scaled up, or scaled out without requiring structural changes to the middleware tier or web tier.

FIG. 1 is a block diagram depicting an example N-tier architecture, according to an embodiment. Referring to FIG. 1, N-tier application 100 includes two or more tiers 102a to 102i. Each of tiers 102a to 102i includes one or more targets, represented by targets 104a to 104j. The number and configuration of the tiers within N-tier application 100 and targets within each tier may vary from implementation to implementation.

Each of tiers 102a to 102i may communicate with one or more other tiers and is responsible for performing a different set of functions. Example tiers may include, without limitation, web, application, middleware, data/database, and presentation tiers. In addition to being logically separated, in some embodiments, the tiers may be physically separated from each other. For example, a physical separation may involve a web tier and application tier residing on one appliance, while the database tier resides on separate appliance. In other embodiments, all of the tiers may reside on the same appliance.

Targets 104a to 104j are software and/or hardware components or modules used to carry out a particular set of functions for each tier. In some embodiments, a target may comprise a server, a host, and/or some other system that responds to requests received from other tiers within system 100 or from sources external to system 100. For example, a target in a web tier may comprise a web server for responding to web requests received from external clients. In another example, a data tier may comprise a database server that responds to data access requests from targets residing in other tiers in system 100. A target may comprise a virtual server and/or machine, a physical server and/or machine, or some combination of software and hardware. In other embodiments a target may comprise a set of one or more processes used to carry out a particular function. For example, the target may be a database server instance, a middleware instance, a listener, or a set of application processes. Targets 104a to 104j may interact and work together to host the multi-tier application.

Data Replication Between Different Sites

A site generally comprises a set of different targets that may be used for running a multi-tier application. In some embodiments, the set of targets for a site may be substantially located at a same geographic location, such as in a particular datacenter, although the datacenter may have more than one site. Multi-tier application components running at one site (a "primary site") may replicate data to one or more geographically different sites ("standby sites") to protect against data loss and to allow for application relocation to the standby site.

The primary site replicates data to a standby site by sending the standby site a current copy of the data. The data that is replicated from primary site to a standby site may vary from implementation to implementation and may generally comprise data that may be used to recover components from different tiers of a multi-tier application. Example data may include, without limitation, application data, metadata, configuration data, database data, and security data.

Replication may be performed periodically, on-demand, or continuously, depending on the particular implementation. With scheduled replication, a user may define a schedule for automatic replication. If a schedule is established, then the replication occurs at the defined interval. The interval may be every half-hour, hour, day, week, month or some other period of time. With on-demand replication, the replication process is initiated when the user requests. With continuous replication, the replication process occurs continuously without any user intervention. As soon as one replication package successfully arrives at the standby site, the subsequent replication process automatically begins.

A storage replication channel may be used during replication. A storage replication channel is a network channel that is dedicated specifically to replication traffic between storage systems at the primary site and the standby site. Storage replication channels may increase the speed and security of replicating data between different geographic locations. In addition or alternatively, data replication may be performed through other communication channels. For example, data replication may be performed through a plurality of interconnected computer networks, such as the Internet.

Differential and/or snapshot-based replication may be used to reduce replication overhead. According to differential replication, only data that has changed from a previous replication package is sent in a subsequent replication package to the standby site. Thus, the amount of data that is sent in a replication package may be greatly reduced since data that remains unchanged and has been previously replicated is not sent to the standby site.

Snapshot-based replication involves generating a snapshot image of the current state of a master storage system which is replicated to a secondary storage system. Depending on the configuration used, the process may be repeated as soon as the snapshot is replicated, or it may be triggered at certain times. This technique may reduce bandwidth since it involves replicating the state of the system at certain points in time such that not every write has to be replicated. This technique may also improve latency because replication may be performed without confirming writes at both sites at once. Thus, performance may be greatly increased, but if local storage is lost, the remote storage may not have a current copy of the data.

Data replication between databases on different sites may be adjusted to provide different levels of protection depending on the particular implementation. In an example embodiment, one or more of a plurality of different modes may be used to replicate data from a database on the primary site (the "primary database") to a database on the standby site (the "standby database"). Three example modes are described below: maximum availability, maximum performance, and maximum protection. However, other replication modes may also be implemented.

With maximum availability, transactions do not commit until all redo data for recovering those transactions have been written to the online redo log and to the standby redo log on at least one synchronized standby database. If the primary database cannot write its redo stream to at least one synchronized standby database, it may operate as if it were in maximum performance mode to preserve primary database availability until it is again able to write its redo stream to a synchronized standby database. This mode guards against data loss if the primary database fails and a second fault does not prevent a complete set of redo data from being sent from the primary database to at least one standby database.

With maximum performance, transactions are allowed to commit as soon as all redo data generated by those transactions has been written to the online log. Redo data is also written to one or more standby databases, but this is done asynchronously with respect to transaction commitment, so primary database performance is unaffected by delays in writing redo data to the standby database(s). This mode offers slightly less data protection than maximum availability mode, but it may reduce the impact on primary database performance.

With maximum protection, the redo data for recovering a transaction is written to both the online redo log and the standby redo log on at least one synchronized standby database before the transaction commits. To prevent data loss, the primary database shuts down, rather than continuing to process transactions if it cannot write its redo stream to at least on synchronized standby database. This mode prioritizes data protection, but may reduce primary database availability. Two standby databases may be used to protect a primary database that runs in this mode to prevent a single standby database failure from causing the primary database to shutdown.

Disaster Recovery System Overview and Example Site Topologies

Figure 2A:
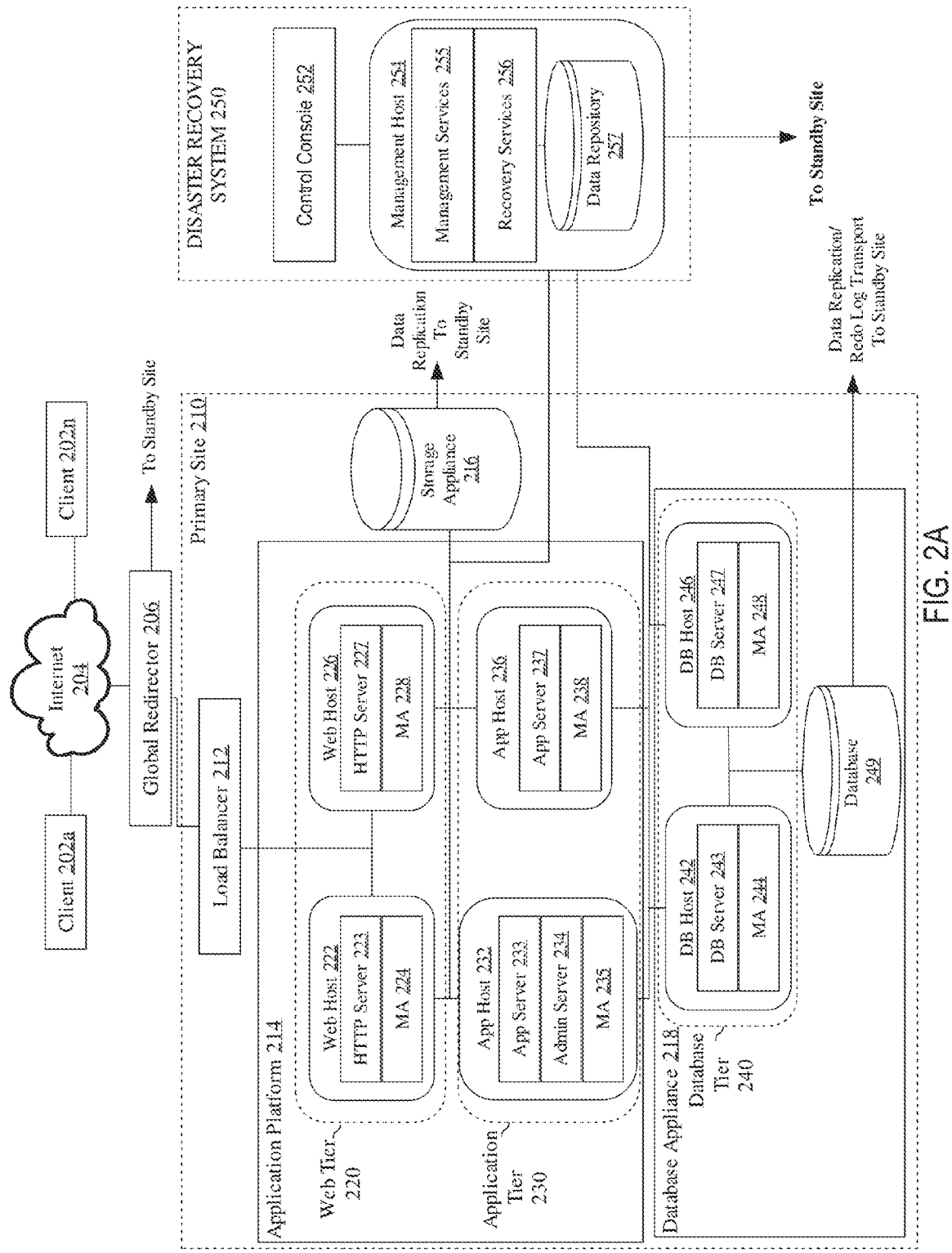
FIGS. 2A and 2B are block diagrams depicting an example disaster recovery system for recovering a multi-tier application, according to an embodiment.
Figure 2B:
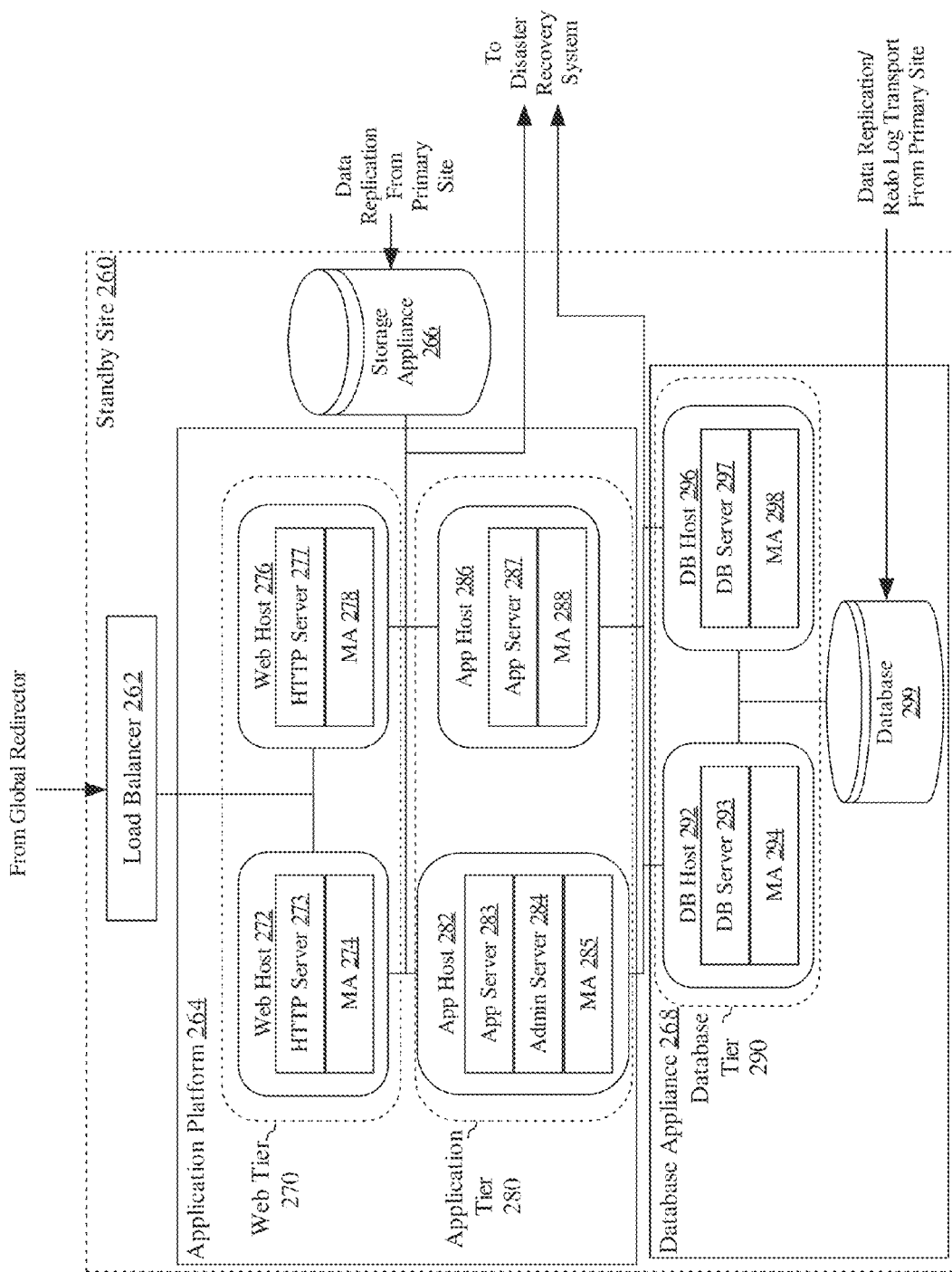

FIGS. 2A and 2B are block diagrams depicting an example disaster recovery system for recovering a multi-tier application, according to an embodiment. Disaster recovery system 250 generally comprises management console 252 and management host 254. Management console 252 includes a user interface that allows a user to monitor and administer the disaster recovery system from one location on a network. Management host 254 includes management services 255 for managing targets on primary site 210 and standby site 260, disaster recovery services 256 for managing site switchovers and/or failovers, and data repository 257 for storing management and/or disaster recovery data. Disaster recovery system 250 may be communicatively coupled to primary site 210 and standby site 260 by a leased line, one or more private networks, and/or one or more public networks, such as Internet 204.

Primary site 210 generally comprises primary site load balance 212, application platform 214, storage appliance 216, and database appliance 218. Web tier 220 and application tier 230 run on application platform 214, while database tier 240 runs on database appliance 218.

Web tier 220 comprises webhosts 222 and 226, which include a set of one or more targets for processing web requests. For example, the set of targets may include HTTP servers 223 and 227, which run on webhosts 222 and 226, respectively. Monitoring agents 224 and 228 are also installed on webhosts 222 and 226, respectively.

Application tier 230 comprises apphosts 232 and 236, which include a set of one or more targets for handling application operations between web tier 220 and database tier 240. For example, the set of targets on apphost 232 may include application server 233 and administration server 234, while the set of targets on apphost 236 may include application server 237 and no administration server. Monitoring agents 235 and 238 are also installed on apphosts 232 and 236, respectively.

Database tier 240 comprises database hosts 242 and 246, respectively, which include a set of one or more targets for storing and retrieving data from database 249. For example, database servers 243 and 247 may run on database hosts 242 and 246, respectively. Monitoring agents 244 and 248 are also installed on database hosts 242 and 246 respectively.

Standby site 260 is completely symmetric with primary site 210. Accordingly standby site includes standby site load balancer 262, application platform 264, storage appliance 266, and database appliance 268. Web tier 270 and application tier 280 run on application platform 264, and database tier 290 runs on database appliance 268. Web tier 270 includes HTTP servers 273 and 277, which run on webhosts 272 and 276, respectively. Monitoring agents 274 and 278 are used to monitor web tier 270. Application tier 280 includes application server 283 and administration server 284, which run on apphost 282, and application server 287, which runs on webhost 286. Monitoring agents 285 and 288 are used to monitor application tier 280. Database tier 290 includes database hosts 292 and 296, database servers 293 and 297, monitoring agents 294 and 298, and database 299.

Storage appliance 216 stores data for web tier 220 and application tier 230. For example, storage appliance 216 may store application data, configuration data, administration data, and/or security data Storage appliance 216 replicates data stored for web tier 220 and 230 to storage appliance 266 at standby site 260 such as described in the "Data Replication Between Different Sites" section above. The data that is replicated to storage appliance 266 may be used to recover the web and application tiers of a multi-tier application at the standby site in the event of a switchover or failover.

Database 249 stores data for database tier 240. For example, database 249 may store database object data, database metadata, redo logs, and/or undo logs. Database 249 replicates data stored for database tier 240 to database 299 at standby site 260. The data that is replicated to database 299 may be used to recover the database tier of the primary site at the standby site in the event of a switchover or failover.

Clients 202a to 202n represent one or more clients that may access primary site 210 and standby site 260 through Internet 204. Global redirector 206 directs client requests to one of the primary site 210 or standby site 260 based on which site is active (i.e., the site that currently has a designated role as the "primary" site). For example, client requests may be directed initially to primary site 210 until a switchover or failover event occurs. Disaster recovery system 160 may then generate and process a disaster recovery plan to recover the multi-tier application running on primary site 210 at standby site 270. The site switchover or failover may happen transparently and without any input from clients 202*a* to 202*n*.

Although specific topologies are depicted for primary site 210 and standby 260, the components on each site may vary from implementation to implementation. In some implementations, the number and type of targets on each tier may vary. For example, the web tiers may have additional or fewer HTTP servers and/or non-HTTP based web servers. In some implementations, the number and type of tiers may vary. For example, primary site 210 and standby site 260 may include a presentation tier in addition to or instead of a web tier. In some implementations, the hardware configuration may vary. For example, database tier may execute on the same appliance as the web tier and application tier, rather than a separate database appliance.

Site Symmetry

The symmetry between a primary site and a secondary site may vary from implementation to implementation. Site symmetry relates to whether the primary and standby sites are exact or partial replicas of each other. Primary and standby sites may be completely symmetric, partially symmetric, or asymmetric, depending on the particular implementation.

In a completely symmetric site, the targets of the primary site and standby site are substantially identical. For example, the primary and standby sites may have substantially identical hardware, load balancers, middleware instances, applications, and databases. The same port numbers may also be used for both sites.

In a partially symmetric configuration, the primary and standby sites have substantially identical software topologies, but the underlying hardware may differ. For example, the primary and standby sites may have the same number of middleware instances, applications, and databases, but the number of racks, storage appliances, and/or the hardware processors may differ.

In an asymmetric configuration, the primary and standby sites have different software and hardware topologies. For example, the standby site may have fewer resources than the primary site, such as fewer servers, load balancers, middleware instances, and/or applications than the primary site.

Topology Monitoring

In some embodiments, the disaster recovery system is configured to monitor site topologies. A site topology includes hardware and/or software components that are currently deployed at a site. The topology may further comprise the relationships between targets, such as dependencies, connectivity relationships, and/or other associations.

In order to monitor site topologies, monitoring agents may be installed on different hosts within the multi-tier system. Once installed, the monitoring agent generates and/or collects topology metadata for the respective target(s) that it is monitoring. The monitoring agent sends the topology metadata to the disaster recovery system, which may use the topology metadata to generate a disaster recovery plan according to techniques described in further detail below.

The topology metadata that is generated or collected may generally comprise information that identifies or describes the hardware and/or software infrastructure of a site. Example topology metadata may include, without limitation, target identification data that identifies each target on a particular site, target property data that describes a set of properties associated with the respective target, and relationship data that identifies relationships between targets.

Referring to FIGS. 2A and 2B, each of monitoring agents 224, 228, 235, 238, 244, and 248 on primary site 210 and monitoring agents 274, 278, 285, 288, 294, and 298 on standby site 260 collect topology metadata for the respective hosts on which they are installed and send the topology metadata to management host 254. In response to receiving the topology metadata, management host 254 stores the data in data repository 257. Disaster recovery system 250 may process the topology metadata to determine where targets are installed, what the targets do, and how the targets interact. For example, based on the topology metadata received from primary site 210, disaster recovery system may determine that web tier 220 has two web hosts, each with a respective HTTP server, and that the web tier is the entry point for processing client requests.

Disaster Recovery Plan

In order to provide a recovery strategy for failing over applications and data to a geographically separate standby site, the disaster recovery system may be configured to generate a disaster recovery plan. A disaster recovery plan includes a collection of step by step instructions for performing an end to end recovery of a multi-tier application, such as an enterprise class mission critical application, in the event of disaster or planned maintenance. For example, the disaster recovery plan may specify steps to relocate all components of an application across the stack (e.g., the web tier, application tier, database tier, etc.) running on the primary site to a standby site.

The disaster recovery plan may include one or more operation plans for different disaster recovery operations that may be executed by the disaster recovery system. Each operation plan defines an execution flow including an ordered sequence of steps for carrying out a particular operation. For example, operation plans may be generated for one or more of the following:

Stop-Site-A: Brings down application(s) and database(s) at the primary site;

Start-Site-B: Bring up application(s) and database(s) at the standby site;

Switchover-to-Site-B: Reverses the roles of the primary site and the standby site such that a current standby site becomes the new primary site and the current primary site becomes the new standby;

Switchback-to-Site-A: Reverses the roles of the new primary site (old standby) and the new standby site (old primary) that is applicable to a previous switchover;

Failover-to-Site-B: Makes a current standby site the new primary site after the primary site becomes unavailable (for example due to unplanned downtime at the primary site); and/or Failover-to-Site-A: Makes the new standby site (old primary) the primary site after the new primary site (old standby) becomes unavailable.

In addition to the ordered sequence of steps, an operation plan may include one or more attributes for the steps to define how the respective step will be executed. Example attributes for a particular step in the plan may include, without limitation:

The target to which the step applies,

An operation type that the step entails;

An error mode for the step; and/or

An execution mode for the step

For instance, a particular step for starting a database server instance may have attributes that identify the database host where the instance should be started and indicate that the step is part of a switchover operation, that the disaster recovery process should stop on failure, and that the step may be performed in parallel with one or more other steps in the plan. The error mode and execution mode attributes are discussed in further detail below.

The steps that are specified in a disaster recovery plan may vary from implementation to implementation. Example steps may include without limitation:

Running pre checks (e.g to determine if the infrastructure is ready for DR operation)
Running pre scripts (e.g scripts run on sites before performing actual DR operation)
Running post scripts (e.g scripts run on sites after performing actual DR operation)
Performing unmount operation for a file system or database
Performing mount operation for a file system or database
Performing role reversal for one or more databases
Performing storage role reversals
Starting a set of one or more processes on a specified target host; and/or
Stopping a set of one or more processes on a specified target host.

The disaster recovery plan may vary based on the topologies of the primary site and the standby site. An example switchover operation plan, for example, may include deactivating a multi-tier application at the primary site and activating the multi-tier application at the standby site. The deactivation/activation of the multi-tier application may involve bringing down processes at the primary site that are associated with the multi-tier application, unmounting file systems at the primary site, performing role reversal of storage artifacts, performing a database switchover, mounting file systems on the standby site, and bringing up processes associated with the multi-tier application at the standby site.

Figure 3A:
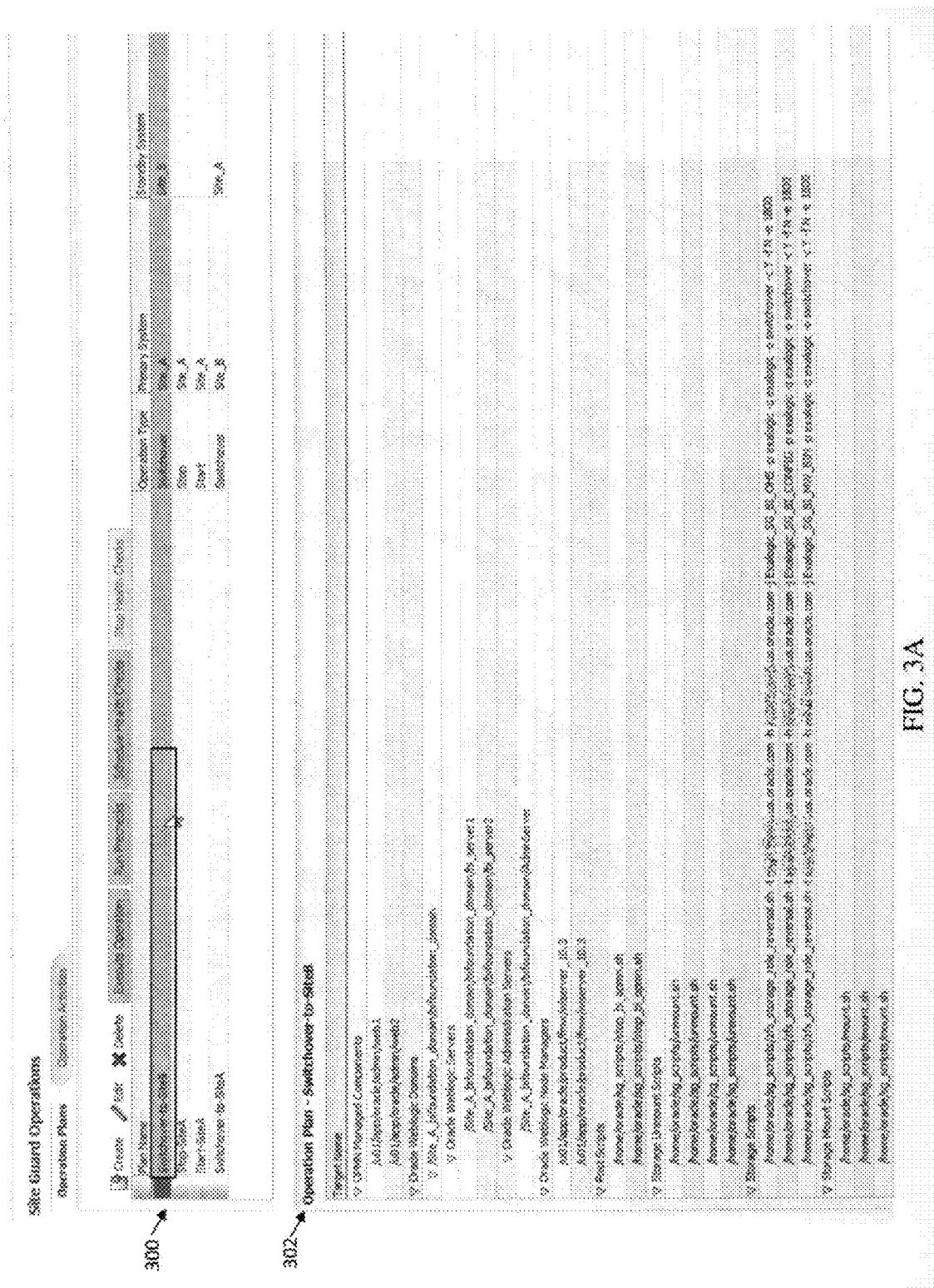
FIGS. 3A and 3B are screenshots depicting an example disaster recovery plan interface, according to an embodiment.
Figure 3B:
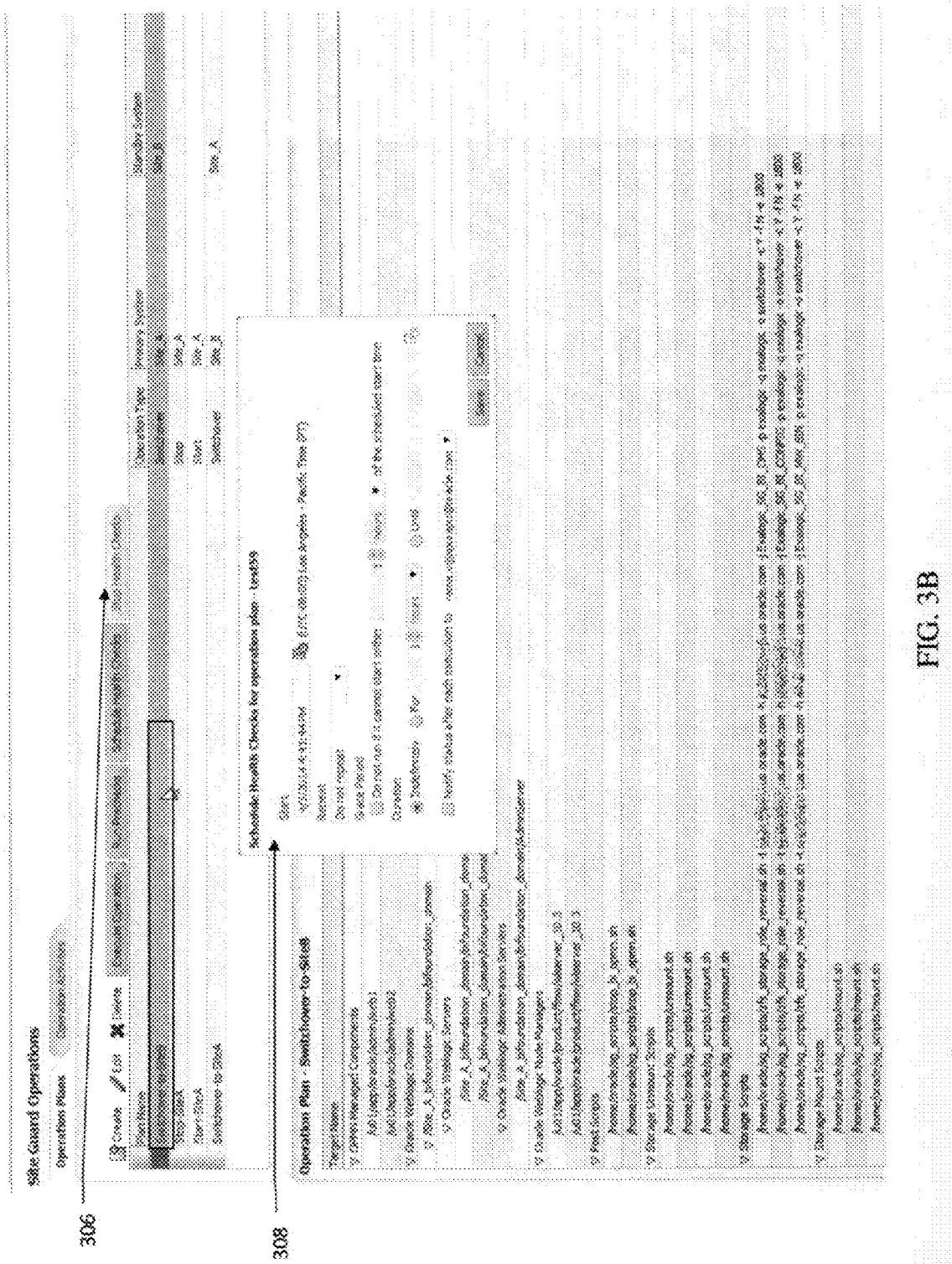

FIGS. 3A and 3B are screenshots of an example disaster recovery plan interface, according to an embodiment. Referring to FIG. 3A, recovery plan 300 includes a plurality of operation plans, which are displayed in panel 300. A user may navigate panel 300 to create, edit, delete, execute, and/or run prechecks, schedule health checks and/or stop health checks on a particular operation plan. Panel 302 depicts the particular steps of the selected switchover operation plan. Each step in recovery plan 302 identifies the target name to which a step applies and a location of scripts or other computer-readable instructions for applying the step to identified target. Each step may also include an icon to the left of the name that allows a user to drill down and view the sub-steps, if any, for a particular step. The substeps for a particular step may also have an icon that allows the user to further drill down and view substeps of a substep. For example, the step for bringing down Weblogic Domains at Site A includes substeps for stopping Weblogic Servers and Administration Servers. The steps and substeps of operation plan 303 comprise step by step instructions for performing a site switchover, including relocating a multi-tier application from the primary site to a standby site.

Dynamic Topology-Based Disaster Recovery Plan Generation

In some embodiments, the disaster recovery system may generate the disaster recovery plan based on topology metadata received from the primary and standby sites. By processing the topology metadata, the disaster recovery system may construct the notion of a site and generate a disaster recovery plan that is inline with the current state of deployment. For example, the disaster recovery system may process the topology metadata to determine the characteristics of a site, such as the site boundaries, the set of targets that comprise a site, and relationships between the set of targets. Based on such data, the disaster recovery system may determine which application components should be relocated to a standby site, where the application components should be deployed on the standby site (e.g., which tier and/or host), and an order in which the application components should be started.

Referring again to FIGS. 2A and 2B, disaster recovery services 256 may process topology metadata stored in data repository 257 to determine the topology of primary site 210 and standby site 260. Recovery services 256 may use the topology metadata to generate a disaster recovery plan that incorporates the current state of deployment of a multi-tier application that is hosted by the set of targets on primary site 210. For example, recovery services may generate a series of steps for relocating application components deployed on web tier 220, application tier 230, and database tier 240 at primary site 210 to web tier 270, application tier 280, and database tier 290 at standby site 260.

Based on the topology data, recovery services 256 may determine where components of a multi-tier application, such as associated services and processes, are running on the primary site and how they interact. Recovery services 256 may also determine, from the topology data, the set of targets that are available for hosting the multi-tier application at standby site 260. Application components may then be relocated to standby site 260 in a manner that mirrors the deployment on primary site 210. For example, services and processes that are hosted on webhost 222 may be activated on webhost 272, while services and processes on webhost 226 are activated on webhost 276. Similarly, services and processes running on application hosts 232 and 236 may be relocated to application hosts 282 and 286, respectively, while services and processes running on database hosts 22422 and 246 may be relocated to database hosts 292 and 296, respectively. Recovery services 256 adds steps for relocating application components from each of the associated tiers accordingly.

Recovery services 256 may also take into account dependencies and/or other relationships to determine an order for the steps in the disaster recovery plan. For example, if the backend database tier is stopped before the frontend web tier, then clients 202a and 202n may still be able to access primary site 210 and may be unaware that the system is not fully functioning. To prevent this situation from occurring, recovery services 256 may determine, from the topology metadata, that web tier 220 serves as an entry points for a multi-tier application deployed at primary site 210, and that database tier 240 serves as the backend with application tier 230 residing in the middle of the application stack. In response to such a determination, disaster recovery services 256 may generate a disaster recovery plan that stops web tier 220 before application tier 230 and database tier 240 during a switchover operation. Accordingly, disaster recovery services 256 adds to the disaster recovery plan steps for stopping services/processes on web tier 220 before steps for stopping services/processes on application tier 230 and database tier 240.

When relocating the multi-tier application to a standby site, the disaster recovery plan may start the multi-tier application components in the reverse order. For example, the disaster recovery plan may add steps to start database tier 290 before application 280, and application tier 280 before web tier 270. This prevents clients 102a to 102n from accessing standby site 260 before the multi-tier application is fully activated.

The order in which application components are started and stopped within the same tier may also be based on the topology metadata. For example, certain processes within a given tier may rely on the existence of other processes or components to function properly. Disaster recovery services 256 identifies such dependencies and relationships from the topology metadata to determine an order for the steps in the disaster recovery plan.

Disaster recovery services 256 may also add steps for performing predefined pre-checks, and/or executing pre/post-scripts. Pre-checks are built in operations which may be performed by the disaster recovery system to determine whether the underlying infrastructure of the primary and/or standby site is ready for disaster recovery operations such as a switchover or failover. For example, disaster recovery services 256 may add steps for checking whether hosts, agents, applications, databases, storage appliances or other targets are ready to be started or stopped. Pre-scripts and post-scripts are custom scripts that are provided by the user which may be added to the disaster recovery plan to execute user-defined logic before or after performing disaster recovery operations.

In some embodiments, certain steps in the disaster recovery plan may be executed in parallel. For example, certain processes within the same tier may not be dependent on each other and may, therefore, be stopped or started in parallel. Disaster recovery services 256 may, accordingly, determine an execution mode for each step based on the topology metadata.

Reacting to Topology Changes

The topology of the primary site and/or standby site may change for a variety of reasons. For example, certain components may be upgraded, scaled in, scaled down, or scaled out of the site based on changing business demands. The disaster recovery system may dynamically adapt the disaster recovery plan to account for any changes in the current deployment at the primary and standby sites.

Monitoring agents 224, 228, 235, 238, 244, and 248 on primary site 210 and monitoring agents 274, 278, 285, 288, 294, and 298 on standby site 260 may continuously or periodically send updated topology metadata to management host 254, which stores the updated topology metadata in data repository 257. Based on the updated topology metadata, disaster recovery system 250 can account for and react to any topology changes on primary site 210 or standby site 260. The outdated topology metadata may be discarded, and recovery services 256 may generate a new disaster recovery plan (or update an existing disaster recovery plan) based on the updated topology metadata. Thus, the disaster recovery plan is generated such that it is inline with the current state of deployment including any topology changes.

Automatic Persistence of Disaster Recovery Plan

In some embodiments, the disaster recovery system is configured to provide automatic persistence of the disaster recovery plan. Once a disaster recovery plan is generated, recovery services 256 may store the plan in persistent storage, such as data repository 257. The plan may be accessed at a later time to perform disaster recovery operations or to be updated by a system administrator (e.g., the system administrator may manually add, remove, and/or otherwise edit the steps in the disaster recovery plan)

A disaster recovery plan may be used multiple times to perform disaster recovery operations. For example, disaster recovery system 250 may access a disaster recovery plan stored in data repository 257 to perform a switchover or failover operation from primary site 210 to standby site 260. Disaster recovery system 250 may access the same disaster recovery plan to perform a switchback or failover operation from the new primary site (standby site 260) to the old primary site (primary site 210). Disaster recovery system 250 may then use the same plan to perform another switchover or failover operation from primary site 210 to standby site 260. Accordingly, once generated, the disaster recovery plan may be persistently stored for later use and reuse.

Processing the Disaster Recovery Plan

Once generated, the disaster recovery plan may be processed by disaster recovery system 250 to perform a recovery operation, such as a site switchover or failover. The steps that are executed by disaster recovery system 250 may include, without limitation the operations listed above such as stopping or starting application components on a specified target, executing pre-check and pre/post scripts, performing storage role reversal operations including mounting or unmounting file systems or databases. Disaster recovery system 250 executes the steps in the order in which they occur in the operation plan.

Figure 4:
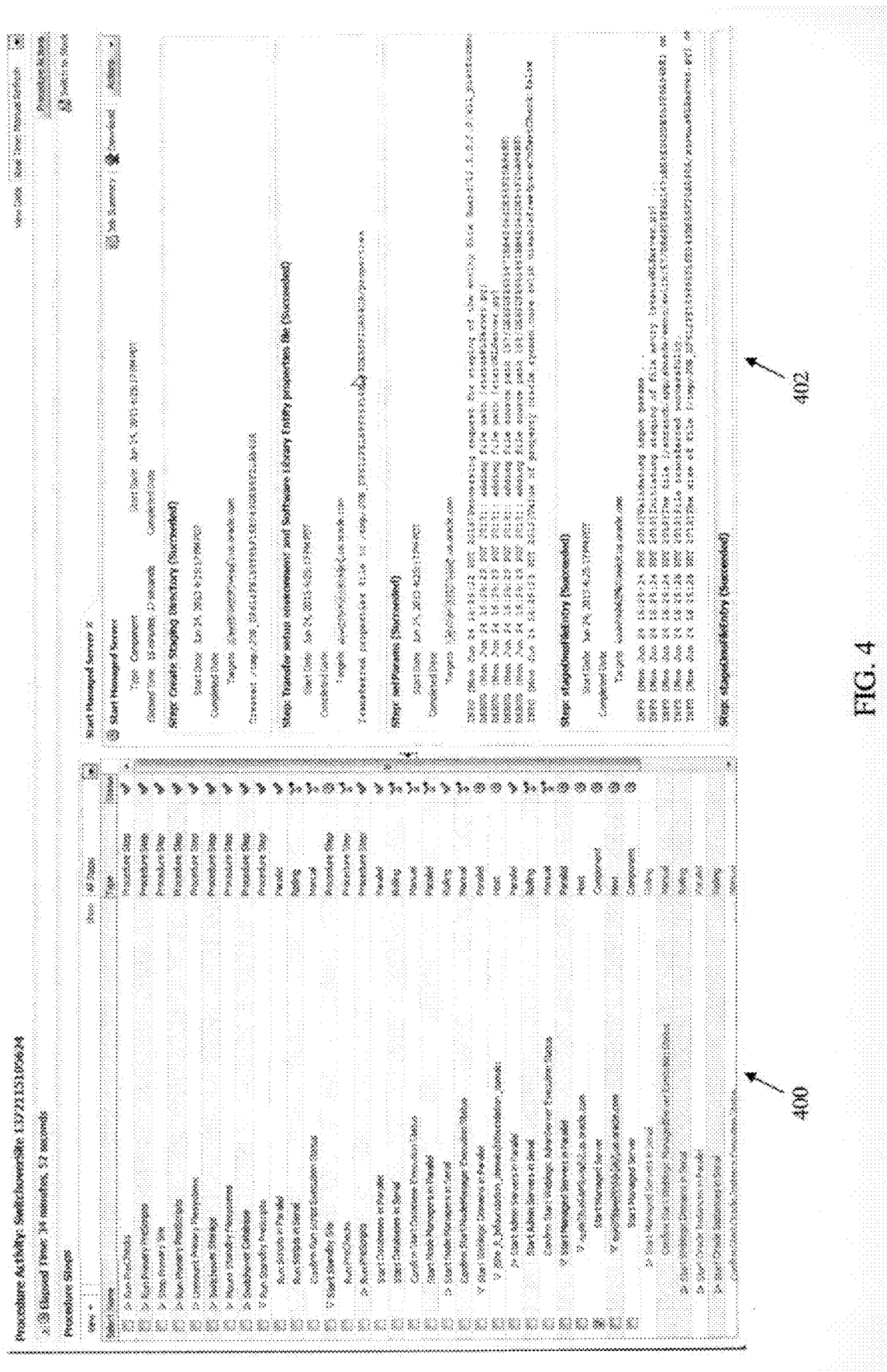
FIG. 4 is a screenshot depicting an example status view of a disaster recovery plan during execution, according to an embodiment.

FIG. 4 is a screenshot depicting an example status view of a disaster recovery plan during execution, according to an embodiment. Panel 400 displays the steps of a switchover operation and the execution status of each respective step. The execution status is represented by the 'Status' column which is updated with a check mark upon successful completion of a step. The user may select a particular step from the operation plan being executed to view more details regarding the execution status of the step, which is presented in panel 402. For example, for the step "Start Managed Server", panel 402 displays a type, elapsed time, start date, and completed date for the step. Panel 402 further displays a list of sub-steps for the step "Start Managed Server", and an execution status for each sub-step. The recovery operation is complete when all steps in the operation plan indicate a completed status (e.g., a checked box icon).

Once disaster recovery system 250 has completed processing the disaster recovery plan, the standby site becomes the new primary site. For example, after a failover or switchover operation, global redirector 206 may redirect client requests to standby site 260 (the new primary site). The client may access the same applications and data on standby site 260 that were deployed on primary site 210 immediately before the failover or switchover occurred.

Execution Mode

In some embodiments, the steps of a disaster recovery plan may be associated with an execution mode attribute. The execution mode may specify whether a particular step is to be executed in a serial order or whether the particular step may be executed in parallel with one or more other steps in the disaster recovery plan.

In serial mode, the step waits for the immediately preceding step to complete before execution begins. The step is then executed completely before the execution flow moves on to the next step. For example, the disaster recovery plan may specify that a set of steps for starting a plurality of processes or services at the standby site should be executed in serial order. Thus, a first process is started on a target according to the order specified by the steps. After successful completion of the step, a next process may be started, etc., with each step waiting for the successful completion of the previous step before being executed.

In parallel execution mode, the step may be concurrently executed with one or more other contiguous steps. For example, the disaster recovery plan may specify that a set of steps for starting a plurality of processes or services at the standby site may be executed in parallel. Thus, a step for initiating one of the processes does not need to wait for the successful completion of a previous step before being executed.

One-Click Switchover

In an embodiment, the disaster recovery system provides a one-click disaster recovery solution which spans across an entire stack of a multi-tier system. For example, management console 252 may present a clickable button or some other user interface element to allow a system administrator to initiate a disaster recovery operation, such as a site switchover. In response to a single user input (e.g., the click of a button), disaster recovery system 250 may automatically generate the disaster recovery plan and execute the steps of the disaster recovery plan according to the techniques described herein to perform the disaster recovery operation.

Error Management Framework

In a disaster recovery scenario, errors may be encountered during execution of a recovery plan. For example, some hosts might go down, become unreachable, or some servers might not start. However, even if an error occurs, the functionality of a particular site may be minimally impacted, and an administrator may still wish to proceed with a particular disaster recovery operation. To address such failures, the disaster recovery services framework may provide error management support through configurable error modes and dynamic runtime error support.

In some embodiments, the error management framework may support error modes including the following:

Stop on error; and/or
Continue on error.

In addition or alternatively, the error management framework may include the following dynamic runtime error operations:

Retry a failed step;
Ignore a critical failure;
Suspend a disaster recovery operation; and/or
Resume a disaster recovery operation.

Configurable Error Modes

In some embodiments, the disaster recovery system provides an option to define the error mode for individual steps of a disaster recovery plan. The error mode specifies what the disaster recovery system should do if an error is encountered during execution of the particular step. Example error modes that may be specified by a user include, without limitation, stop on error and continue on error.

In the stop on error mode, the execution flow of an operation plan stops if a step having the defined stop on error attribute fails. The disaster recovery system may then prompt the user for confirmation of the failure before the execution flow continues. Once confirmation is received, the execution flow may continue, and subsequent steps in the operation plan may be executed.

In the continue on error mode, the execution flow of an operation plan continues even if the step having the continue on error attribute fails. The status of the step may be displayed as having failed, but the subsequent steps in the operation plan may be executed without stopping or requiring input from a user. If a sub-step failed, then the top-level step status may be displayed as having completed with errors.

Figure 5A:
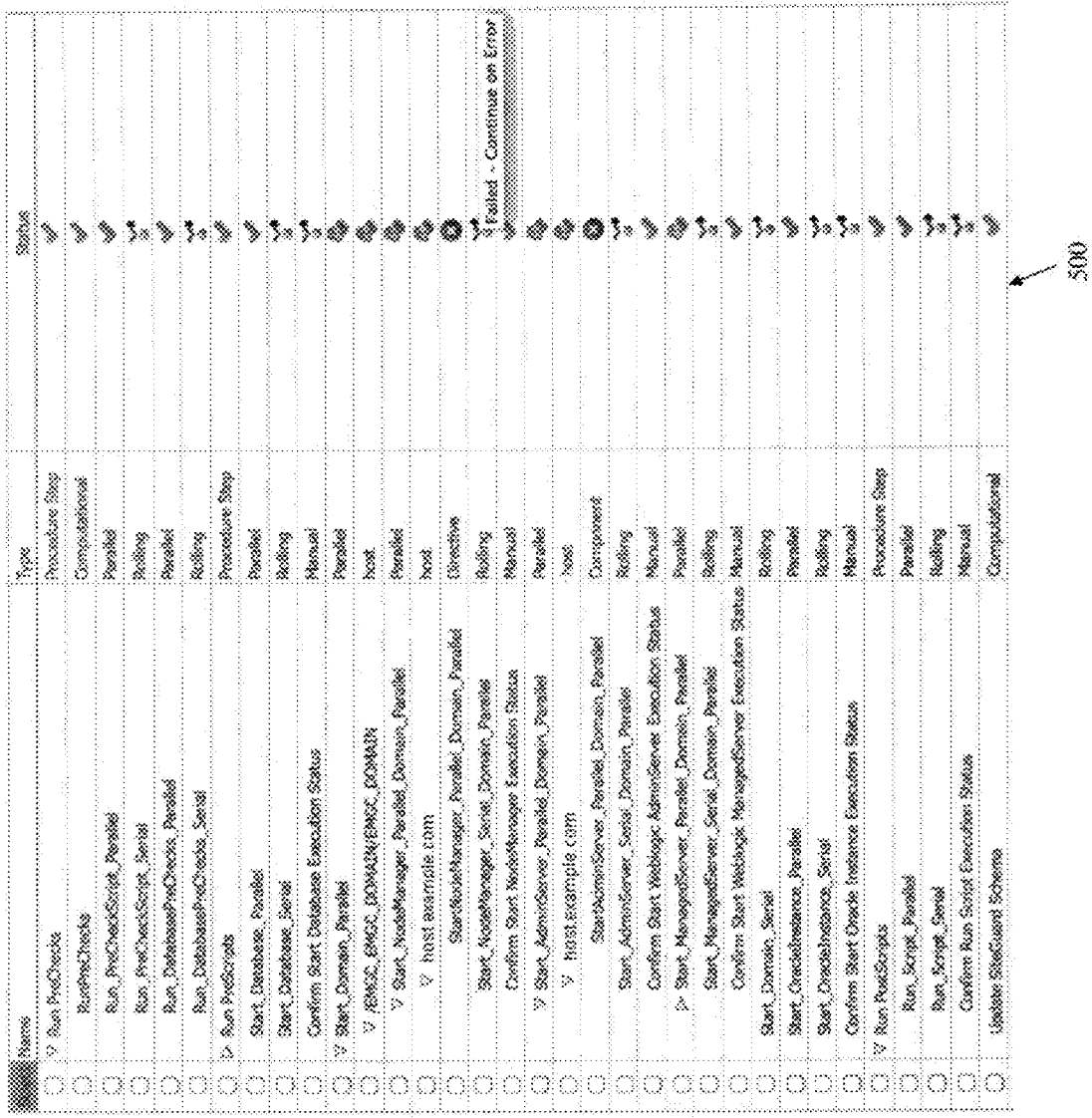
FIGS. 5A and 5B are screenshots depicting the status of an execution plan when the error mode for a particular step is stop on error versus when the error mode for the particular step is continue on error, according to an embodiment.
Figure 5B:
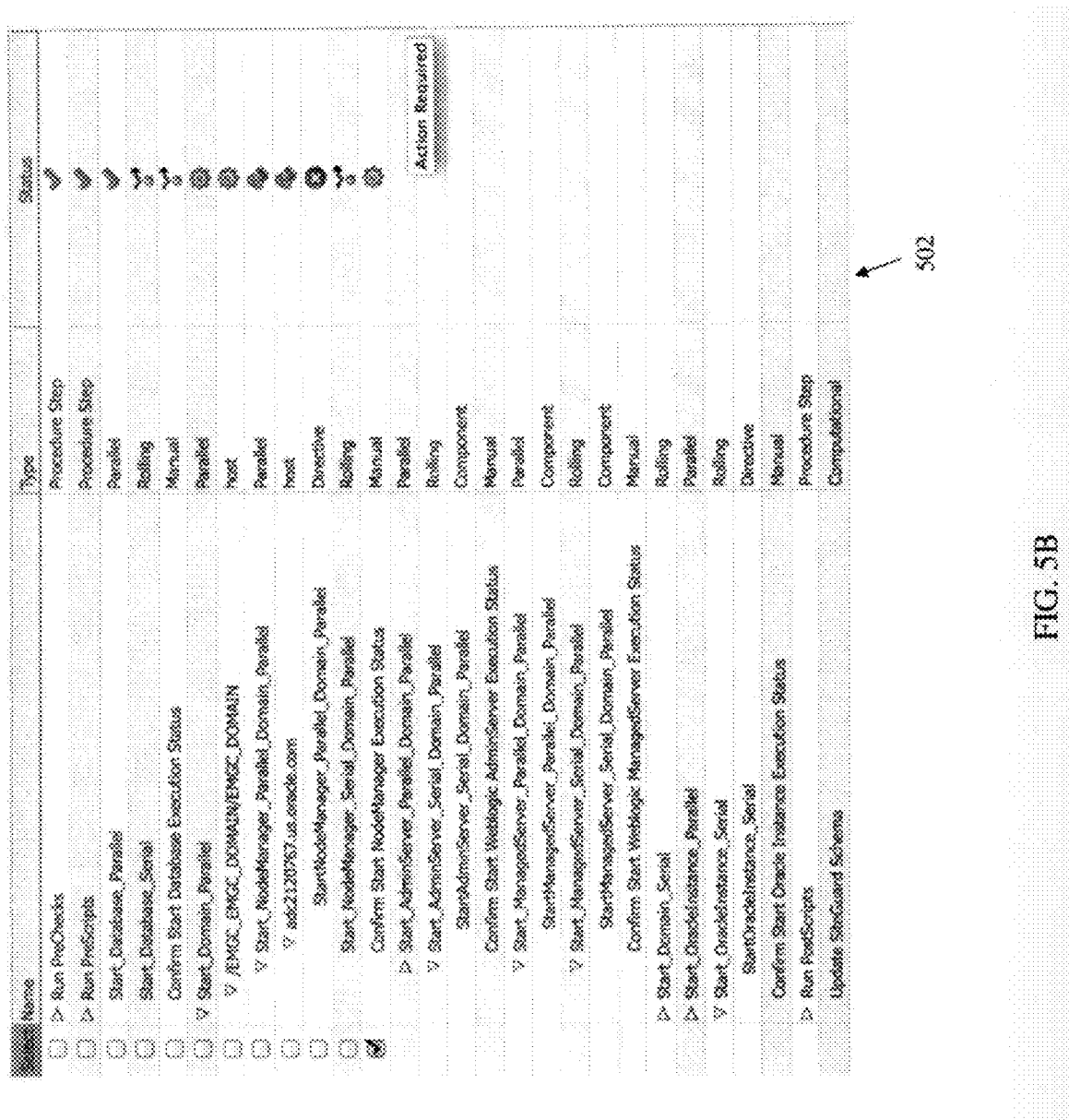

FIGS. 5A and 5B depict screenshots of the status of an execution plan when the error mode for a particular step is stop on error versus when the error mode for the particular step is continue on error. In both screenshots 500 and 502, the status icon for "Start NodeManager" indicates that the step failed. In screenshot 500, where the step is defined as stop on error, the subsequent steps are not executed by the disaster recovery system until further input is received from a user. By contrast, screenshot 502 depicts that the subsequent steps were executed without stopping.

The user may define and update the error mode for an individual step through an interface presented by control console 252. For example, the user may update the error mode via a command-line interface by specifying the name of the operation plan, the number of the step which should be updated, and an error mode attribute that should be associated with the step. In another example, the user may navigate to the step using a graphical user interface to select a set of one or more steps and input a respective error mode. In response to receiving the user's input defining the error mode for a particular step, the disaster recovery plan stores data that associates the step with the particular error mode.

Each step may be associated with a default error mode. For example, if no user input is received to define an error mode for a particular step, then the disaster recovery plan may, by default, define the step as stop on error. Accordingly, the disaster recovery system stops if the step fails, even though no error mode was explicitly defined for the step. The default error mode may vary from implementation to implementation.

Runtime Error Handling

During execution of a disaster recovery operation, the disaster recovery system may support a plurality of error operations in the event of a failure. These operations may include, without limitation, retrying a failed step, ignoring a failure, suspending a disaster recovery operation, and/or resuming a disaster recovery operation.

For the retry failed step operation, the disaster recovery system retries a step in the event that an error occurs. For example, if the disaster recovery system is unsuccessful in performing a step on a particular target, such as starting or stopping a process, the disaster recovery system may make one or more subsequent attempts before continuing the execution flow of a disaster recovery plan.

An ignore on failure operation, by contrast, involves continuing with the execution flow even if an error has occurred. Thus, instead of making subsequent attempts in the event of a failure, the failed step is ignored, and subsequent steps in the operation plan are processed.

A suspend disaster recovery operation exits the workflow of the operation plan completely. In contrast to the stop on error operation described above, suspending the disaster recovery operation is global and applies to the entire operation plan, whereas the stop on error applies to an individual step within the plan. Thus, the granularity of the operations is different.

Figure 6:
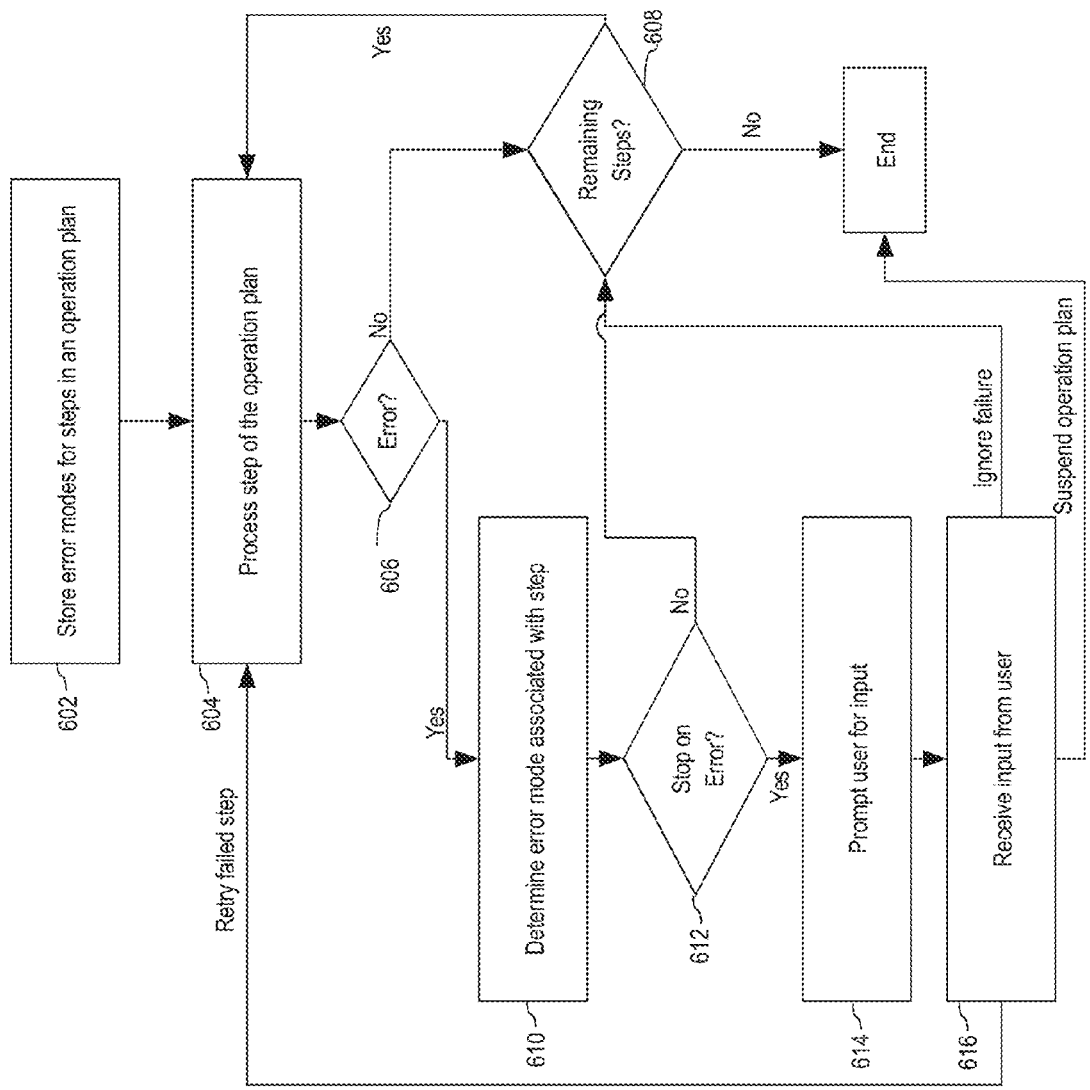
FIG. 6 is a flowchart depicting example error handling logic during execution of a disaster recovery plan, according to an embodiment.

A resume disaster recovery operation continues with the workflow of an operation plan that was previously suspended. This operation may attempt to resume where the particular recover operation was suspended Error Handling Logic FIG. 6 is a flowchart depicting example error handling logic during execution of a disaster recovery plan, according to an embodiment. In step 602, the disaster recovery system receives and stores error modes for steps in an operation plan. For each step, the error mode may be specified by a user or a default error mode may be used.

In step 604, the disaster recovery system processes a particular step of an operation plan. For example, the disaster recovery system may attempt to start or stop an application component on a specified target as described above.

In step 606, the disaster recovery system determines whether the step failed. If the step did not fail, then the process continues to step 608, and the disaster recovery system determines whether there are any other steps remaining in the disaster recovery plan. If there are steps remaining in the operation plan, then the process returns to step 604 for the next step in the operation plan. Otherwise, the process ends. If, at step 606, the disaster recovery system determines that the step failed, then the process continues to step 610.

In step 610 disaster recovery system determines the error mode that was defined for the particular step. If at step 612, the error mode is continue on error, then the process continues to step 608, and the disaster recovery system determines whether there are any other steps remaining in the disaster recovery plan. If there are steps remaining in the operation plan, then the process returns to step 604 for the next step in the operation plan. Otherwise, the process ends. If, at step 612, the error mode is stop on error, then the process continues to step 614.

In step 614, the process prompts the user for further input. The prompt may comprise a notification that the step has failed and that further action is required. In addition or alternatively, the prompt may identify available options, such as retrying the failed step, ignoring the failed step, and/or suspending the disaster recovery operation.

In step 616, the disaster recovery system receives input from the user that identifies a particular action for the disaster recovery system to take in view of the step failure. If the user requests a retry of the failed step, then the process returns to step 604 for the same step that failed, and the disaster recovery system retries execution of the failed step. If the user requests to ignore the failed step, then the process continues to step 608, and execution flow of the operation plan continues. If the user requests that the disaster recovery operation be suspended, then the process ends.

Validation and Health Report Framework

To help reduce the number of errors that may be encountered during a disaster recovery operation, the disaster recovery system may provide a validation and health report framework for validating a disaster recovery plan. The validation and health report framework analyzes a particular disaster recovery plan to determine whether there are any potential problems that may prevent the plan from executing properly. Based on the analysis of the disaster recovery plan, the validation and health report framework may generate a report comprising an itemized list of errors, warnings, and/or other notification data to update an administrator about the status of a particular disaster recovery plan.

When analyzing a disaster recovery plan, the disaster recovery system may perform a set of one or more validation checks. Each of the validation checks may be used to determine a health associated with different aspects of the disaster recovery plan before the disaster recovery plan is executed Example validation checks may include, without limitation:

Topology validation operations; and/or

Data validation operations.

The result of each of the validation checks may be included in the itemized report to identify any potential problems associated with the different aspects of the disaster recovery plan. If no potential problems are identified, then the report may identify the disaster recovery plan as healthy and having passed all the validation checks. The validation and health report framework provides holistic views of disaster recovery readiness by consolidating various checks, which are run across the application stack.

The validation and health report framework may include a scheduling system for scheduling periodic validation and health checks for a particular disaster recovery plan. For example, a user may wish to receive nightly reports for a particular operation plan. Upon request, \the validation and health report framework may schedule the validation checks to be performed at a particular time each night so that the itemized report may be delivered on a nightly basis to the user.

Topology Validation Health Check

Topology validation health checks may include comparison operations for comparing the topology that existed at the time of creation of an operation plan with the state of the topology at the time of execution. Based on the comparison, the disaster recovery system may determine whether underlying topologies of the primary site and/or the standby site have been modified. For example, the disaster recovery system may detect when new components are added to or removed from a particular tier on the primary or standby site. If the disaster recovery system detects a change in the underlying topology of the primary and/or standby site, then the disaster recovery system may generate an error or warning message to notify the administrator.

To detect changes in the underlying topology for a particular operation plan, disaster recovery system 250 may process the topology metadata that is stored in data repository 257. For example, disaster recovery system 250 may compare newly received topology metadata with older topology metadata to determine whether components have been added to or removed from primary site 210 and/or standby site 260 since the creation of the operation plan.

If a change in the topologies of the primary site and/or standby site is identified, then disaster recovery system 250 may add an error or warning message to the health report of the corresponding disaster recovery plan. The message may include a description of the topology modification(s) that triggered the warning. For example, the message may indicate how the topologies of the primary site and/or standby site have changed, including target identification data, such as names and locations of the targets that have changed and description data indicating how the identified targets have changed since the creation of the corresponding operation plan. Example warnings may include, without limitation, a notification identifying a particular target that is newly added to a site topology, or a notification identifying a particular target that has been removed from a site topology.

The topology validation health check may further comprise availability and credential validation operations. The availability and credential validation operations determine whether target hosts on the primary and standby are currently available and whether the credentials for accessing the hosts are valid. If a target host becomes unreachable and/or the credentials become invalid, then the disaster recovery system may generate an error or warning message to identify the administrator.

In an embodiment, monitoring agents 224, 228, 235, 238, 244, and 248 on primary site 210 and monitoring agents 274, 278, 285, 288, 294, and 298 on standby site 260 may include the credentials for accessing the respective target host in the topology data that is sent to disaster recovery system 250. To perform the availability and credential checks, disaster recovery system 250 may extract the credentials for a respective target host from the topology data sent by the monitoring agent installed on the respective target host. Disaster recovery system 250 may then attempt to logon to the target host using the storage credentials to determine whether the target host is responsive and/or whether the target host accepts the credentials.

If disaster recovery system 250 determines that a target host has become unavailable or that the credentials for accessing the target host are no longer valid, disaster recovery system 250 may add an error or warning message to the health report of the corresponding disaster recovery plan. The message may identify the target host to which the error/warning applies including target identification data and a description of the error/warning. For example, the entry in the report may indicate that a particular target host has become unresponsive or that the access credentials for the particular target host are no longer valid.

The topology validation checks prevent errors that may arise due to changes in the deployment of the primary and/or standby sites. For example, a particular target host may become unavailable on a standby site due to planned or unplanned outages. One or more steps of a disaster recovery plan may involve relocating application components to the particular target host on the standby site. By performing the topology validation checks, the outage may be detected and reported to an administrator before a disaster recovery event occurs and the disaster recovery plan is executed. The administrator may then take corrective action such that the operation plan may be executed without issue at the time of a disaster recovery event.

Data Validation Health Check

Data replication failures may interrupt business continuity and result in the loss of valuable data in the event of a failover. To protect against problems that may arise from such failures, the disaster recovery operation may perform data validation operations.

In some embodiments, the data validation operation checks data sync lag between primary and standby sites. As the primary and standby sites may be geographically apart, there may be some expected lag in syncing data between the sites. However, a significant increase in the lag may indicate that the data replication is experiencing problems. Accordingly, the data validation operation may analyze the lag to determine potential issues that may occur.

To determine the lag time, disaster recovery system 250 may compare time stamp data associated with replicating data from the primary site to a standby site. The replication lag is calculated by computing the difference between the timestamp of the last replication package updated (sync'ed) at target from source and the current timestamp at the target. If the lag exceeds a threshold amount of time, disaster recovery system may add an error or warning message to the health report for the corresponding disaster recovery plan.

Disaster recovery system 250 may also track whether data replication stopped working completely. For example, disaster recovery system 250 may determine whether a particular data replication package that was sent by primary site was not successfully received by the standby site or whether the primary site stopped sending data replication packages at all. If disaster recovery system 250 determines that data replication has stopped working, disaster recovery system 250 may add a corresponding error or warning message to the health report for the corresponding disaster recovery plan.

The data validation checks may be performed for databases and/or storage appliances. For example, a first data validation check may be performed with respect to storage appliance 216 and storage appliance 266 to determine whether the data is synchronized between the two storage appliances. For the same disaster recovery plan, a second data validation check may be performed with respect to database 249 and database 299 to determine whether the databases are synchronized. If an issue is identified based on either the first or second validation check, then the health report may be updated accordingly. The entry to the health report may identify the particular targets to which the error or warning applies and a description of the problem. Example warning may include, without limitation, a notification that data sync lag exceeds a threshold, that data replication packages are not being sent, or that data replication packages are not being successfully received.

The data validation checks may prevent loss of data that may occur due to problems relating to data replication and that may affect the continuity of a multi-tier application. For example, if data replication starts to lag or stops functioning, the administrator may be notified and take appropriate action to correct the problem before a disaster recovery event occurs. This helps ensure that data at the standby site is up-to-date and in sync with data at the primary site, allowing for a smooth transition to the standby site in the event of a failover or switchover.

Configurable Reporting

The validation and health report framework may provide a user with flexibility to define or otherwise control how a disaster recovery system performs and reports validation and health checks. For example, the user may configure various aspects of the validation and health check reporting, including, without limitation:

Selecting the plans for which the disaster recovery system performs validation operations and generates health reports, Configuring the timing of the validation checks and health reports, and/or Adjusting the manner in which the reports are delivered.

The validation and health report framework may allow the user to select a subset of operation plans for which the user would like to receive health reports. Referring to FIG. 3B, for example, the user may navigate to a particular operation plan using a mouse or other pointing device. The user may then select the "Schedule Healthchecks" button 304 to enable validation operations and health checks for the particular operation plan. In response, the disaster recovery system may present dialog box 306, which allows the user to customize when the validation operations and health checks are performed and how the reports are delivered. The user may specify a start date/time, whether the health checks should be repeated (i.e., run periodically or only a single time), a grace period for running the health checks if they cannot begin at their specified start time, a duration for running the health checks, and a notification format for delivering the reports. When the user selects the "Save" button, the disaster recovery system will run the validation operations and generate the health reports described herein for the selected operation plan in accordance with the user's selected configurations.

In some cases, the health checks may be enabled for one plan, but not for another operation plan. For example, the user may want to receive health checks only for the Switchover-to-SiteB operation plan listed in panel 300. Therefore, the user may select the "Schedule Healthchecks" button 304 to enable health reports for this plan, while validation operations and health checks are not run for the other operation plans. In other embodiments, the user may enable health checks for all of the respective operation plans.

When the user enables health reporting for a particular operation plan, the user may further configure the manner in which the disaster recovery system generates the health report for the respective plan. In some embodiments, the validation and health report framework allows the user to configure the timing of the validation checks and health reports. For example, the disaster recovery system may receive user input that specifies how frequently the user would like to receive validation reports for a particular operation plan. In response, the disaster recovery system stores the preference in association with the corresponding operation plan. The disaster recovery system further periodically performs validation checks and generates health reports for the disaster recovery plan based on the frequency specified by the user. For example, the disaster recovery system may generate health reports for a given plan on a daily, weekly, or monthly basis. If a user does not specify a period of time, a default value may be used. The default value may vary from implementation to implementation.

In other embodiments, the health report may be generated on-demand. For example, the user may want to view the current health of a disaster recovery plan at a particular moment in time. In response to the user's request, the disaster recovery system may perform one or more of the validation operations described above to generate the health report on demand.

The validation and health report framework may also allow the user to configure the manner in which the health report for a particular operation plan is delivered. In some embodiments, the disaster recovery system may receive a set of one or more email addresses from the user for a particular operation plan. The disaster recovery system stores the email addresses in association with the disaster recovery plan. When a health report is generated for the disaster recovery plan, the disaster recovery system identifies the set of one or more email addresses that are stored, and sends the health report to each email address in the set of one or more email addresses. The health report may be sent as an attachment or may be included in the body of the email, depending on the particular implementation. Accordingly, the user may receive periodic email reports that indicate the health of one or more operation plans. In other embodiments, the user may specify a location for storing or delivering the reports. In addition or as an alternative to emailing the reports, the disaster recovery system may store or send the reports to a specified location that is associated with an operation plan.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions ("code") in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
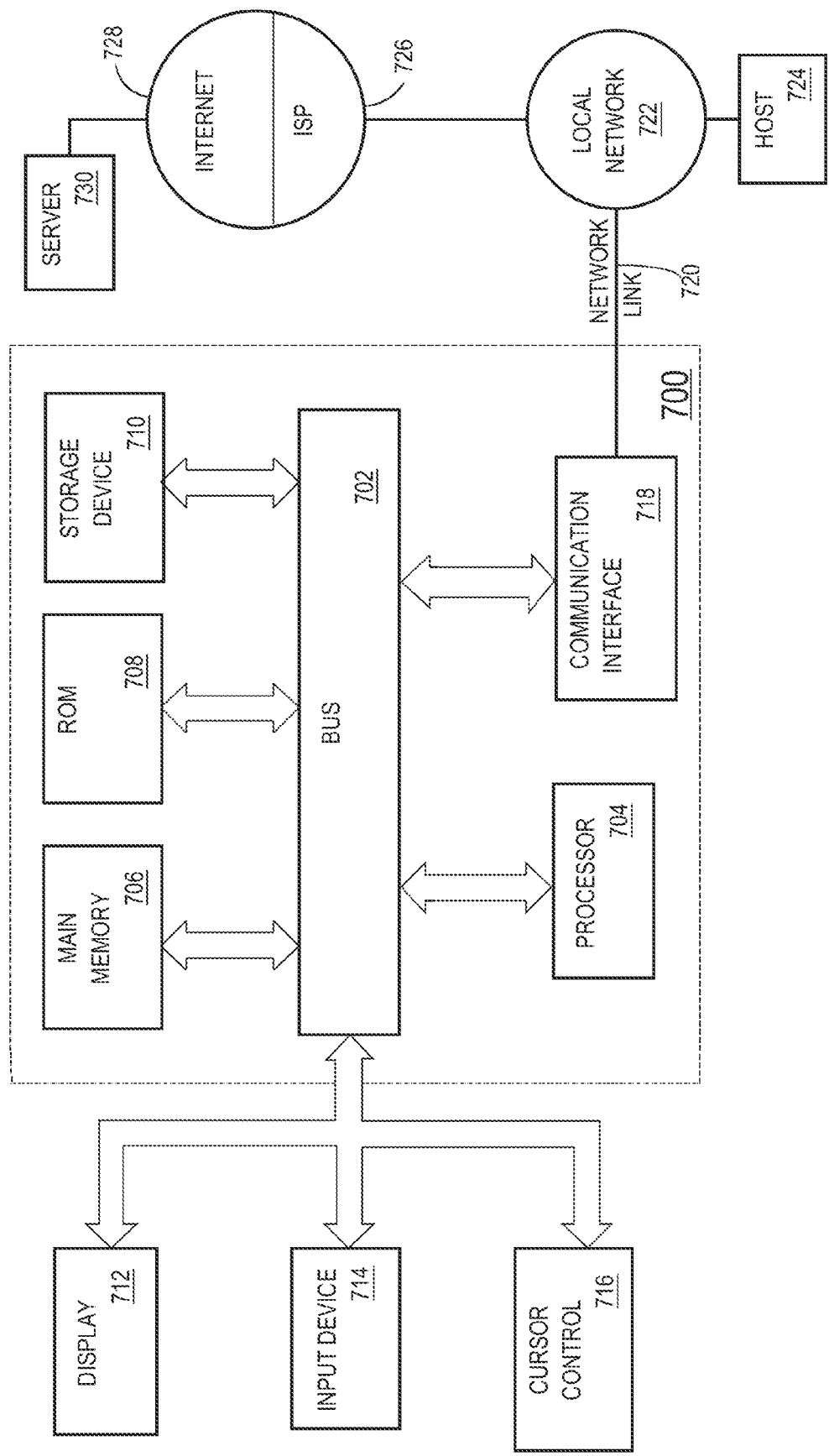
FIG. 7 is a block diagram that illustrates a computer system upon which an embodiment may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions (i.e., code) to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for generating a disaster recovery plan comprising:
   monitoring a first set of topology metadata for a first site on which a multi-tier application is deployed and active and a second set of topology metadata for a second site on which the multi-tier application is deployed and not fully active;
   wherein the first set of topology metadata identifies a first set of targets associated with a plurality of tiers on the first site on which the multi-tier application is deployed and active;
   wherein the second set of topology metadata identifies a second set of targets associated with a plurality of tiers on the second site on which the multi-tier application is deployed; and
   based, at least in part, on the first set of topology metadata for the first site and the second set of topology metadata for the second site, generating a disaster recovery plan including an ordered set of instructions for activating the multi-tier application at the second site;
   wherein the method is performed by one or more computing devices.

2. The method of claim 1:
   wherein the first set of topology metadata further identifies associations between the first set of targets including a dependency between at least a first target in a first tier of the plurality of tiers and a second target in a second tier of the plurality of tiers; and
   wherein generating the disaster recovery plan including an ordered set of instructions for activating the multi-tier application at a second site comprises generating the ordered set of instruction in an order based, at least in part, on the associations between the first set of targets including the dependency between the at least first target in the first tier of the plurality of tiers and the second target in the second tier of the plurality of tiers.

3. The method of claim 1, wherein the ordered set of instructions of the disaster recovery plan further include instructions for deactivating the multi-tier application at the first site.

4. The method of claim 2, further comprising:
   detecting a change to a topology of the first site;
   in response to detecting the change to the topology of the first site, updating the first set of topology metadata to generate an updated first set of topology metadata; and
   based, at least in part, on the updated first set of topology metadata, generating another disaster recovery plan including an ordered set of instructions for deactivating the multi-tier application at the first site and activating the multi-tier application at the second site.

5. The method of claim 4, wherein the plurality of tiers on the first site and the second site includes at least one of a data tier, an application tier, a middleware tier, a presentation tier, or a web tier, and the change is to one of the plurality of tiers.

6. The method of claim 4, wherein the change includes an addition or a removal of an instance of a software application within at least one of the plurality of tiers or an addition or a removal of a hardware component from at least one of the first site.

7. The method of claim 1, wherein the ordered set of instructions include instructions for stopping a set of processes at the first site and starting a set of processes at the second site in an order that is determined, based at least in part, on the first set of topology metadata and the second set of topology metadata.

8. The method of claim 1, wherein the disaster recovery plan identifies a subset of instructions within the ordered set of instructions as being able to be executed in parallel on at least one of the first site or the second site.

9. The method of claim 1, further comprising processing the ordered set of instructions to relocate the multi-tier application to the second site; wherein generating the disaster recovery plan and processing the ordered set of instructions to relocate the multi-tier application to the second site are performed in response to receiving a same particular input from a user.

10. The method of claim 1, wherein generating the disaster recovery plan including an ordered set of instructions for activating the multi-tier application at a second site is performed in response to detecting a switchover or failover event.

11. One or more non-transitory computer-readable media storing code for generating a disaster recovery plan, the code, when executed by one or more processors, causes:
monitoring a first set of topology metadata for a first site on which a multi-tier application is deployed and active and a second set of topology metadata for a second site on which the multi-tier application is deployed and not fully active;
wherein the first set of topology metadata identifies a first set of targets associated with a plurality of tiers on the first site on which the multi-tier application is deployed and active;
wherein the second set of topology metadata identifies a second set of targets associated with a plurality of tiers on the second site on which the multi-tier application is deployed; and
based, at least in part, on the first set of topology metadata for the first site and the second set of topology metadata for the second site, generating a disaster recovery plan including an ordered set of instructions for activating the multi-tier application at the second site.

12. The one or more non-transitory computer-readable media of claim 11:
wherein the first set of topology metadata further identifies associations between the first set of targets including a dependency between at least a first target in a first tier of the plurality of tiers and a second target in a second tier of the plurality of tiers; and
wherein generating the disaster recovery plan including an ordered set of instructions for activating the multi-tier application at a second site includes generating the ordered set of instruction in an order based, at least in part, on the associations between the first set of targets including the dependency between the at least first target in the first tier of the plurality of tiers and the second target in the second tier of the plurality of tiers.

13. The one or more non-transitory computer-readable media of claim 11, wherein the ordered set of instructions of the disaster recovery plan further include instructions for deactivating the multi-tier application at the first site.

14. The one or more non-transitory computer-readable media of claim 13, wherein the code includes code that when executed by said one or more processors causes:
detecting a change to a topology of the first site;
in response to detecting the change to the topology of the first site, updating the first set of topology metadata to generate an updated first set of topology metadata; and
based, at least in part, on the updated first set of topology metadata, generating another disaster recovery plan including an ordered set of instructions for deactivating the multi-tier application at the first site and activating the multi-tier application at the second site.

15. The one or more non-transitory computer-readable media of claim 14, wherein the plurality of tiers on the first site and the second site includes at least one of a data tier, an application tier, a middleware tier, a presentation tier, or a web tier, and the change is to one of the plurality of tiers.

16. The one or more non-transitory computer-readable media of claim 14, wherein the change includes an addition or a removal of an instance of a software application within at least one of the plurality of tiers or an addition or a removal of a hardware component from at least one of the first site.

17. The one or more non-transitory computer-readable media of claim 11, wherein the ordered set of instructions include instructions for stopping a set of processes at the first site and starting a set of processes at the second site in an order that is determined, based at least in part, on the first set of topology metadata and the second set of topology metadata.

18. The one or more non-transitory computer-readable media of claim 11, wherein the disaster recovery plan identifies a subset of instructions within the ordered set of instructions as being able to be executed in parallel on at least one of the first site or the second site.

19. The one or more non-transitory computer-readable media of claim 11, wherein the code includes code that when executed by said one or more processors causes:
processing the ordered set of instructions to relocate the multi-tier application to the second site;
generating the disaster recovery plan and processing the ordered set of instructions to relocate the multi-tier application to the second site in response to receiving a same particular input from a user.

20. The one or more non-transitory computer-readable media of claim 11, wherein the code includes code that when executed by said one or more processors causes generating the disaster recovery plan including an ordered set of instructions for activating the multi-tier application at a second site in response to detecting a switchover or failover event.

* * * * *

UNITED STATES PATENT AND TRADEMARK OFFICE
CERTIFICATE OF CORRECTION

PATENT NO. : 9,495,258 B2  
APPLICATION NO. : 14/265572  
DATED : November 15, 2016  
INVENTOR(S) : Sampath et al.

It is certified that error appears in the above-identified patent and that said Letters Patent is hereby corrected as shown below:

In the Specification

In Column 11, Line 64, after "plan)" insert -- . --.

In Column 14, Line 58, after "suspended" insert -- . --.

Signed and Sealed this  
Thirteenth Day of June, 2017

Joseph Matal  
*Performing the Functions and Duties of the*  
*Under Secretary of Commerce for Intellectual Property and*  
*Director of the United States Patent and Trademark Office*